United States Patent
Nagayama et al.

(10) Patent No.: US 10,241,358 B2
(45) Date of Patent: Mar. 26, 2019

(54) LIQUID CRYSTAL GRATING AND MANUFACTURING METHOD AND DRIVING METHOD THEREFOR, AND SPLICED SCREEN

(71) Applicant: BOE TECHNOLOGY GROUP CO., LTD., Beijing (CN)

(72) Inventors: Kazuyoshi Nagayama, Beijing (CN); Song Song, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 241 days.

(21) Appl. No.: 15/121,023

(22) PCT Filed: Apr. 28, 2015

(86) PCT No.: PCT/CN2015/077623
§ 371 (c)(1),
(2) Date: Aug. 23, 2016

(87) PCT Pub. No.: WO2016/107027
PCT Pub. Date: Jul. 7, 2016

(65) Prior Publication Data
US 2018/0203277 A1  Jul. 19, 2018

(30) Foreign Application Priority Data
Dec. 30, 2014  (CN) .......................... 2014 1 0843669

(51) Int. Cl.
*G02F 1/29* (2006.01)
*G02F 1/133* (2006.01)
*G02F 1/1333* (2006.01)
*G02F 1/1343* (2006.01)

(52) U.S. Cl.
CPC .......... *G02F 1/13336* (2013.01); *G02F 1/133* (2013.01); *G02F 1/1333* (2013.01);
(Continued)

(58) Field of Classification Search
CPC ..... G02F 1/13336; G02F 1/133; G02F 1/1333
See application file for complete search history.

(56) References Cited

U.S. PATENT DOCUMENTS 5,673,062 A * 9/1997 Katakura ............. G09G 3/3629
345/103
6,728,023 B1   4/2004 Alioshin et al.
(Continued)

FOREIGN PATENT DOCUMENTS

CN   102981321 A   3/2013
CN   103135291 A   6/2013
(Continued)

OTHER PUBLICATIONS

Interational Search Report and Written Opinion (including English translation of Box V) dated Sep. 22, 2015, for corresponding PCT Application No. PCT/CN2015/077623.
(Continued)

*Primary Examiner* — Lucy P Chien
(74) *Attorney, Agent, or Firm* — Kinney & Lange, P.A.

(57) ABSTRACT

A liquid crystal grating and a manufacturing method and a driving method therefor, and a spliced screen including a liquid crystal grating are disclosed. The liquid crystal grating includes: a first substrate and a second substrate arranged opposite to the first substrate; and liquid crystal molecules filled between the first substrate and the second substrate. The first substrate, the second substrate and the liquid crystal molecules are provided to define at least one grating unit. Each of the grating units includes: a display region; a frame region surrounding the display region; a first frame electrode located on the first substrate and arranged corresponding to the frame region; and a second frame electrode located on the second substrate and arranged corresponding to the frame region. The first frame electrode and the second frame electrode are configured for forming a voltage difference (Continued)

when displaying in the display region, so as to control deflection of the liquid crystal molecules in the frame region, such that light rays scattered into the frame region are emitted out from the frame region of the second substrate. The above liquid crystal grating enables a seam of a spliced screen to have a certain display brightness, thereby improving the display effect of the spliced screen.

19 Claims, 6 Drawing Sheets

(52) U.S. Cl.
CPC ...... *G02F 1/1343* (2013.01); *G02F 1/133308* (2013.01); *G02F 1/134309* (2013.01); *G02F 1/134336* (2013.01); *G02F 1/29* (2013.01)

(56) References Cited

U.S. PATENT DOCUMENTS

| | | | | |
|---|---|---|---|---|
| 2001/0001568 | A1* | 5/2001 | Hiroshi | G02F 1/134363 349/143 |
| 2001/0020985 | A1* | 9/2001 | Hinata | G06F 3/0412 349/12 |
| 2003/0117545 | A1 | 6/2003 | Coker et al. | |
| 2008/0259261 | A1* | 10/2008 | Park | G02F 1/134363 349/139 |
| 2014/0063385 | A1* | 3/2014 | Yang | G06F 3/044 349/15 |

FOREIGN PATENT DOCUMENTS

| | | |
|---|---|---|
| CN | 203433242 U | 2/2014 |
| CN | 103676286 A | 3/2014 |
| CN | 10440136 A | 3/2015 |
| CN | 204302632 U | 4/2015 |
| WO | 2010056288 A1 | 5/2010 |

OTHER PUBLICATIONS

Extended European Search Report, for European Patent Application No. 15874720.4, dated Oct. 20, 2017, 8 pages.

* cited by examiner

LIQUID CRYSTAL GRATING AND MANUFACTURING METHOD AND DRIVING METHOD THEREFOR, AND SPLICED SCREEN

CROSS-REFERENCE TO RELATED APPLICATION

This application is a Section 371 National Stage Application of International Application No. PCT/CN2015/077623, filed on Apr. 28, 2015, entitled "LIQUID CRYSTAL GRATING AND MANUFACTURING METHOD AND DRIVING METHOD THEREFOR, AND SPLICED SCREEN", which claims priority to Chinese Application No. 201410843669.7, filed on Dec. 30, 2014, incorporated herein by reference in their entirety.

BACKGROUND OF THE INVENTION

Field of the Invention

Embodiments of the present disclosure relate to a field of display technology, and specifically to a liquid crystal grating, a method for manufacturing the liquid crystal grating, a method for driving the liquid crystal grating, and a spliced screen comprising the liquid crystal grating.

Description of the Related Art

With continual development of the flat panel display technology, the large screen splicing technology is widely applied to fields of security, monitoring, medical treatment, broadcast television, advertisement media, etc.

In the large screen splicing technology, it is necessary to splice and assemble a plurality of complete display modules into a large-sized spliced screen having an X×Y array structure (where X represents the number of columns of the display modules of the spliced screen, and Y represents the number of rows of the display modules of the spliced screen) by means of an external support structure. One complete display module typically comprises a display screen, a backlight and a frame for fixing the display screen with the backlight. Due to the frame, the finally assembled spliced screen has a spliced seam, the width of which depends on a sum of the widths of the frames of two adjacent display modules. The spliced seam results in a divided display image, further damages to the continuity and integrity of the image. As for the large-sized spliced screen, the width of the spliced seam should be less than 5 mm, so as to have a good display effect.

In the prior art, the frame width of the display module is typically reduced to reduce the width of the spliced seam. However, the frame width cannot be infinitely reduced due to the limitation on thickness, structural strength of the material or the like of the display module. Currently, the frame width of the display module can reach to 6 mm to 10 mm, in this case, the width of the spliced seam of the spliced screen generally reaches up to 12 mm to 20 mm, which cannot meet the requirement for a high-quality display image.

SUMMARY OF THE INVENTION

In order to overcome the above defects in the prior art, embodiments of the present disclosure provide a liquid crystal grating and a method for manufacturing and a method for driving the liquid crystal grating, and a spliced screen comprising the liquid crystal grating, so as to improve the image display effect of the spliced screen.

According to an aspect of the present disclosure, there is provided a liquid crystal grating, comprising: a first substrate and a second substrate arranged opposite to the first substrate; and liquid crystal molecules filled between the first substrate and the second substrate. The first substrate, the second substrate and the liquid crystal molecules are provided to define at least one grating unit. Each grating units comprises: a display region; a frame region surrounding the display region; a first frame electrode located on the first substrate and arranged corresponding to the frame region; and a second frame electrode located on the second substrate and arranged corresponding to the frame region. The first frame electrode and the second frame electrode are configured for forming a voltage difference, when displaying in the display region, so as to control deflection of the liquid crystal molecules in the frame region, such that light rays scattered into the frame region are emitted out from the frame region of the second substrate.

According to the liquid crystal grating in accordance with some embodiments of the present disclosure, each grating unit further comprises: a first display electrode located on the first substrate and arranged corresponding to the display region; and a second display electrode located on the second substrate and arranged corresponding to the display region. The first display electrode and the second display electrode are configured for forming a voltage difference, so as to control deflection of the liquid crystal molecules in the display region, such that a grating is formed in the display region to achieve a 3D display in the display region; or the first display electrode and the second display electrode are configured to be kept under an identical voltage, so as to control the liquid crystal molecules in the display region to be in an initial alignment state, such that all light rays are allowed to transmit through the display region to achieve a 2D display in the display region.

According to the liquid crystal grating in accordance with some embodiments of the present disclosure, the first frame electrode is made of a metal material, and the second frame electrode, the first display electrode and the second display electrode are made of a transparent conductive material.

According to the liquid crystal grating in accordance with some embodiments of the present disclosure, the first frame electrode is electrically insulated from the first display electrode, and the second frame electrode is electrically insulated from the second display electrode.

According to the liquid crystal grating in accordance with some embodiments of the present disclosure, the first frame electrode comprises a plate electrode, the second frame electrode comprises a frame-shaped electrode, the first display electrode comprises a grating type electrode and the second display electrode comprises a plate electrode.

According to the liquid crystal grating in accordance with some embodiments of the present disclosure, the first frame electrode comprises a plate electrode extending in a region corresponding to the frame region; the second frame electrode comprises at least one frame-shaped electrode, sequentially arranged from large to small in a surrounding manner depending on the size thereof and electrically insulated from each other; the first display electrode comprises a plurality of elongated sub-grating electrodes arranged in parallel with each other; and the second display electrode comprises a plate electrode extending in a region corresponding to the display region.

According to the liquid crystal grating in accordance with some embodiments of the present disclosure, each grating unit further comprises: a first frame signal line arranged at an outside of the first frame electrode for applying a first frame voltage signal to the first frame electrode; a first display signal line arranged at an outside of the first frame electrode, the first display signal line being electrically connected to the first display electrode through a first via hole for applying a first display voltage signal to the first display electrode; a second frame signal line arranged at an outside of the second frame electrode, the second frame signal line being electrically connected to the second frame electrode through a second via hole for applying a second frame voltage signal to the second frame electrode; and a second display signal line extending beyond a periphery of the second frame electrode from the display region, the second display signal line being electrically connected to the second display electrode through the second via hole for applying a second display voltage signal to the second display electrode. A voltage difference between the first frame voltage signal and the second frame voltage signal is formed, and a voltage difference between the first display voltage signal and the second display voltage signal is formed.

According to the liquid crystal grating in accordance with some embodiments of the present disclosure, the first display signal line, the second display signal line and the second frame signal line are made of a metal material.

According to the liquid crystal grating in accordance with some embodiments of the present disclosure, a vertical projection of the second display signal line on the first substrate is partially overlapped with a vertical projection of a black matrix of a display module on the first substrate when the liquid crystal grating and the display module are stacked together.

According to the liquid crystal grating in accordance with some embodiments of the present disclosure, the first substrate and the second substrate each is a flexible substrate.

According to another aspect of the present disclosure, there is provided a manufacturing method for a liquid crystal grating, comprising steps of: forming at least one display region and at least one frame region surrounding the display region on a first substrate and a second substrate, respectively; forming at least one first frame electrode on the first substrate, the at least one first frame electrode being arranged corresponding to the frame region; forming at least one second frame electrode on the second substrate, the at least one second frame electrode being arranged corresponding to the frame region; assembling the first substrate and the second substrate together; and filling liquid crystal molecules between the first substrate and the second substrate such that at least one grating unit is formed by the display region and the frame region on the first substrate and the second substrate, and the liquid crystal molecules. The first frame electrode and the second frame electrode are configured for forming a voltage difference when displaying in the display region, so as to control deflection of the liquid crystal molecules in the frame region, such that light rays scattered into the frame region are emitted out from the frame region of the second substrate.

According to the manufacturing method for the liquid crystal grating in accordance with some embodiments of the present disclosure, the step of forming at least one first frame electrode on the first substrate comprises a step of forming a first display electrode on the first substrate, wherein the first display electrode is arranged corresponding to the display region; the step of forming at least one second frame electrode on the second substrate comprises a step of forming a second display electrode on the second substrate, wherein the second display electrode is arranged corresponding to the display region. The first display electrode and the second display electrode are configured for forming a voltage difference, so as to control deflection of the liquid crystal molecules in the display region, such that a grating is formed in the display region to achieve a 3D display in the display region; or the first display electrode and the second display electrode are configured to be kept under an identical voltage to control the liquid crystal molecules in the display region to be in an initial alignment state, such that all light rays are allowed to transmit through the display region to achieve a 2D display in the display region.

According to the manufacturing method for the liquid crystal grating in accordance with some embodiments of the present disclosure, the step of forming at least one first frame electrode on the first substrate comprises steps of: forming a pattern comprising the first display electrode on the first substrate, the first display electrode being a grating type electrode; forming an insulation layer on the first substrate formed with the first display electrode; forming a first via hole in the insulation layer to expose the first display electrode; and forming a pattern comprising the first frame electrode and a first display signal line on the insulation layer, wherein the first frame electrode is formed as a plate electrode, the first display signal line is located at an outside of the first frame electrode and the first display signal line is electrically connected to the first display electrode through the first via hole.

According to the manufacturing method for the liquid crystal grating in accordance with some embodiments of the present disclosure, the step of forming at least one second frame electrode, arranged corresponding to the display region, on the second substrate comprises steps of: forming a pattern comprising a second frame signal line and a second display signal line on the second substrate; forming an insulation layer on the second substrate formed with the second frame signal line and the second display signal line; forming a second via hole in the insulation layer to expose the second frame signal line and the second display signal line; and forming the second frame electrode and the second display electrode on the insulation layer. The second frame signal line is located at an outside of the second frame electrode, the second frame electrode is a frame-shaped electrode, the second frame electrode is electrically connected to the second frame signal line through the second via hole, the second display electrode is a plate electrode, and the second display electrode is electrically connected to the second display signal line via the second via hole.

According to the manufacturing method for the liquid crystal grating in accordance with some embodiments of the present disclosure, a vertical projection of the second display signal line on the first substrate is partially overlapped with a vertical projection of a black matrix of a display module on the first substrate when the liquid crystal grating and the display module are stacked together.

According to further another aspect of the present disclosure, there is provided a method for driving the liquid crystal grating according to the above various embodiments, wherein the driving method comprises a step of: applying different voltage signals to the first frame electrode and the second frame electrode when driving the display region to display, so as to form a voltage difference between the first frame electrode and the second frame electrode, to control deflection of the liquid crystal molecules in the frame region, such that light rays scattered into the frame region are to emit out from the frame region of the second substrate.

According to the driving method for the liquid crystal grating in accordance with some embodiments of the present disclosure, each grating unit of the liquid crystal grating further comprises a first display electrode and a second display electrode arranged corresponding to the display region, and the driving method further comprises steps of: applying different voltage signals to the first display electrode and the second display electrode, so as to form a voltage difference between the first display electrode and the second display electrode, to control deflection of the liquid crystal molecules in the display region, such that a grating is formed in the display region, to achieve a 3D display in the display region; or applying an identical voltage signal or no voltage signal to the first display electrode and the second display electrode, so as to keep the first display electrode and the second display electrode under an identical voltage, to control the liquid crystal molecules in the display region to be in an initial alignment state, such that all light rays are allowed to transmit through the display region to achieve a 2D display in the display region.

According to the driving method for the liquid crystal grating in accordance with some embodiments of the present disclosure, the first frame electrode comprises a plate electrode, the second frame electrode comprises a frame-shaped electrode, the first display electrode comprises a grating type electrode and the second display electrode comprises a plate electrode. The step of applying the different voltage signals to the first frame electrode and the second frame electrode comprises steps of: applying a first frame voltage signal to the first frame electrode, and applying a second frame voltage signal to the second frame electrode; and the step of applying the different voltage signals to the first display electrode and the second display electrode comprises steps of: applying a first display voltage signal to the first display electrode, and applying a second display voltage signal to the second display electrode.

According to still another aspect of the present disclosure, there is provided a spliced screen, comprising: at least one display module spliced with each other in a matrix arrangement; and the liquid crystal grating according to the above various embodiments, wherein the liquid crystal grating is configured to cover a display surface of the at least one display module, and at least one grating unit of the liquid crystal grating is overlapped with the at least one display module, respectively.

According to the spliced screen in accordance with some embodiments of the present disclosure, the frame regions of the grating units are overlapped with frame regions of the display modules, respectively, and the display regions of the grating units are overlapped with display regions of the display modules, respectively.

According to the spliced screen in accordance with some embodiments of the present disclosure, a substrate of the at least one display module close to the liquid crystal grating is served as the first substrate of the liquid crystal grating.

According to the spliced screen in accordance with some embodiments of the present disclosure, the spliced screen is a flexible spliced screen.

According to the liquid crystal grating and the manufacturing method and the driving method therefor and the spliced screen in accordance with the above various embodiments of the present disclosure, the plurality of the spliced display modules are covered by a liquid crystal grating. The liquid crystal grating comprises grating units corresponding to the plurality of display modules, each grating unit is divided into a display region and a frame region, and a first frame electrode and a second frame electrode are provided at an outside of the display region. When displaying, a voltage difference is formed between the first frame electrode and the second frame electrode so as to control deflection of the liquid crystal molecules in the frame region, thus the optical path of the light rays scattered into the frame region may be changed. The portion of the light rays are emitted out from the frame region of the second substrate, thereby the seam (the seam is mainly formed by the frame) of the spliced screen has a certain display brightness. In such a way, when the display image of the spliced screen is viewed by the human eye, the seam seems to be invisible, thereby greatly improving the display effect of the spliced screen.

BRIEF DESCRIPTION OF THE DRAWINGS

In order to more clearly explain technical solutions according to embodiments of the present disclosure or in the prior art, accompanying drawings for illustrating the embodiments or the prior art will be briefly introduced below. Obviously, the related accompanying drawings merely show a portion of the embodiments of the present disclosure, and it is possible for the person skilled in the art to obtain other accompanying drawings based on these accompanying drawings, without creative efforts.

DETAILED DESCRIPTION OF PREFERRED EMBODIMENTS OF THE INVENTION

In order to provide a better understanding to the above objectives, characteristics and advantages of the present disclosure, the technical solutions of the embodiments of the present disclosure will be clearly and completely described with reference to the accompanying drawings. Obviously, the described embodiments are merely a portion of embodiments of the present disclosure, rather than all the embodiments. Based on the embodiments of the present disclosure, all the other embodiments obtained by the person skilled in the art without creative efforts fall into the protection scope of the present disclosure.

In addition, in the following detailed description, for explanations and interpretations, lots of specific details are illustrated in order to provide a full understanding on embodiments of the present invention. However, obviously, one or more embodiments without these specific details may also be implemented. In other cases, known structures and devices are schematically embodied so as to simplify the accompanying drawings.

According to a general concept of the present disclosure, there is provided a liquid crystal grating, comprising: a first substrate and a second substrate arranged opposite to the first substrate; and liquid crystal molecules filled between the first substrate and the second substrate, wherein the first substrate, the second substrate and the liquid crystal molecules define at least one grating unit. Each grating unit comprises: a display region; a frame region surrounding the display region; a first frame electrode located on the first substrate and arranged corresponding to the frame region; and a second frame electrode located on the second substrate and arranged corresponding to the frame region. The first frame electrode and the second frame electrode are configured for forming a voltage difference when displaying in the display region, so as to control deflection of the liquid crystal molecules in the frame region, such that light rays scattered into the frame region are emitted out from the frame region of the second substrate.

Figure 1:
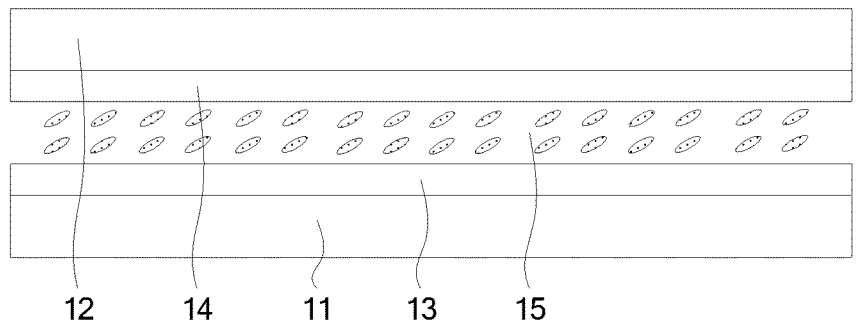
FIG. 1 is a partial schematic cross-sectional view of a liquid crystal grating according to an exemplary embodiment of the present disclosure.
Figure 2:
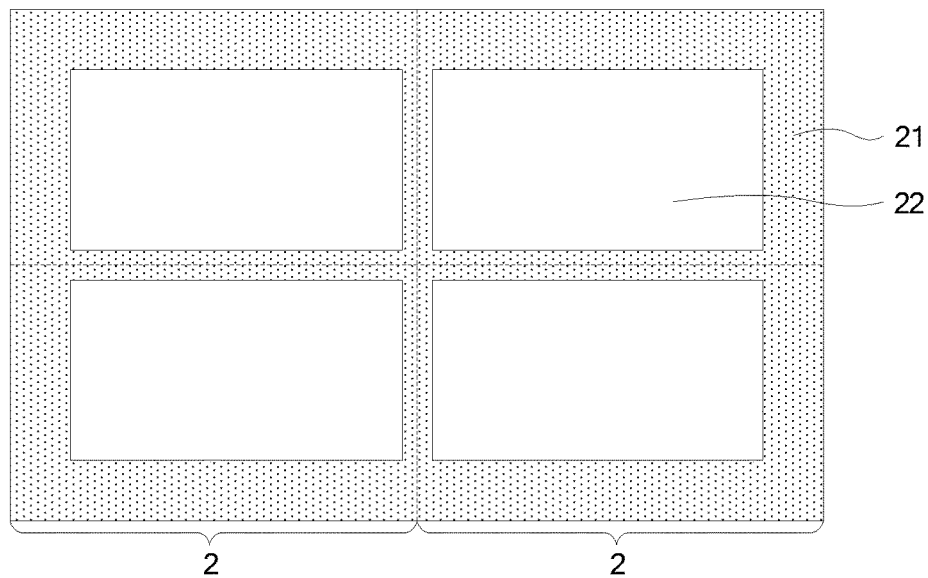
FIG. 2 is a schematic plan view of the liquid crystal grating according to an exemplary embodiment of the present disclosure.

As shown in FIG. 1, the liquid crystal grating according to an exemplary embodiment of the present disclosure comprises a first substrate 11 and a second substrate 12 arranged opposite to the first substrate 11, and liquid crystal molecules 15 filled between the first substrate 11 and the second substrate 12. The first substrate 11 is provided with a first electrode assembly 13, and the second substrate 12 is provided with a second electrode assembly 14.

As shown in FIGS. 2-5, the liquid crystal grating comprises at least one grating unit 2 defined by the first substrate 11, the second substrate 12 and the liquid crystal molecules. Each grating unit comprises a display region 22, a frame region 21 surrounding the display region 22, a first frame electrode 131 located on the first substrate 11 and arranged corresponding to the frame region 21, and a second frame electrode 141 located on the second substrate 12 and arranged corresponding to the frame region 21. The first frame electrode 131 and the second frame electrode 141 are configured for forming a voltage difference when displaying in a 3D or 2D mode in the display region 22, so as to control deflection of the liquid crystal molecules 15 in the frame region 21, such that light rays A scattered into the frame region 21 are emitted out from the frame region 21 of the second substrate 12.

According to the liquid crystal grating in accordance with the embodiment of the present disclosure, different voltages are applied to the first frame electrode 131 and the second frame electrode 141, so that a voltage difference between the first frame electrode 131 and the second frame electrode 141 is formed. In this way, it is possible to control the deflection of the liquid crystal molecules 15 in the frame region 21 of each grating unit 2 of the liquid crystal grating, thus the optical path of the light rays scattered into the frame region 21 is changed, so that a portion of the light rays is emitted out from the frame region 21 of the second substrate 12, resulting in a frame region 21 having a certain display brightness. When the liquid crystal grating covers the display surface of the spliced screen, the frame region of each grating unit of the liquid crystal grating having a certain display brightness is overlapped over the seam of the spliced screen. As a result, when the display image of the spliced screen is viewed by the human eye, the seam seems to be invisible, thereby greatly improving the display effect of the spliced screen.

In the liquid crystal grating according to some embodiments, each grating units further comprises: a first display electrode 132 located on the first substrate 11 and arranged corresponding to the display region 22; and a second display electrode 142 located on the second substrate 12 and arranged corresponding to the display region 22.

The first display electrode 132 and the second display electrode 142 are configured for forming a voltage difference, so as to control deflection of the liquid crystal molecules in the display region 22. In this way, a grating is formed in the display region 22, achieving a 3D display in the display region 22. That is, a light transmitting region and a light shielding region, which are alternately arranged, are formed in the display region 22, and during displaying one frame, one half of the pixels display an image for left eye, and the other half of the pixels display an image for right eye. The pixels displaying the image for the left eye and the pixels displaying the image for the right eye are alternately arranged. Since there is a parallax between the left eye and the right eye, the left eye can only see the pixels displaying the image for the left eye and the right eye can only see the pixels displaying the image for the right eye through one light transmitting region. Thus, the image for the left eye and the image for the right eye are overlapped to form a 3D display effect.

In another aspect, the first display electrode 132 and the second display electrode 142 may also be configured to be kept under an identical voltage, so as to control the liquid crystal molecules in the display region 22 to be in an initial alignment state, to allow all light rays to transmit through the display region 22, to achieve a 2D display in the display region 22. When an identical voltage is applied to the first display electrode 132 and the second display electrode 142, there is no voltage difference between the first display electrode 132 and the second display electrode 142, then the liquid crystal molecules would not affected by the voltage difference, and therefore would not be deflected. As a result, the liquid crystal molecules are kept in the initial alignment state. It should be noted that when the liquid crystal molecules are in the initial alignment state all the incident light rays are allowed to transmit through the display region 22 in the present embodiment.

Therefore, in the present embodiment, by providing a first display electrode 132 and a second display electrode 142 in the region corresponding to the display region 22, it satisfies the requirements of the display device for a 3D display and a 2D display.

Figure 3:
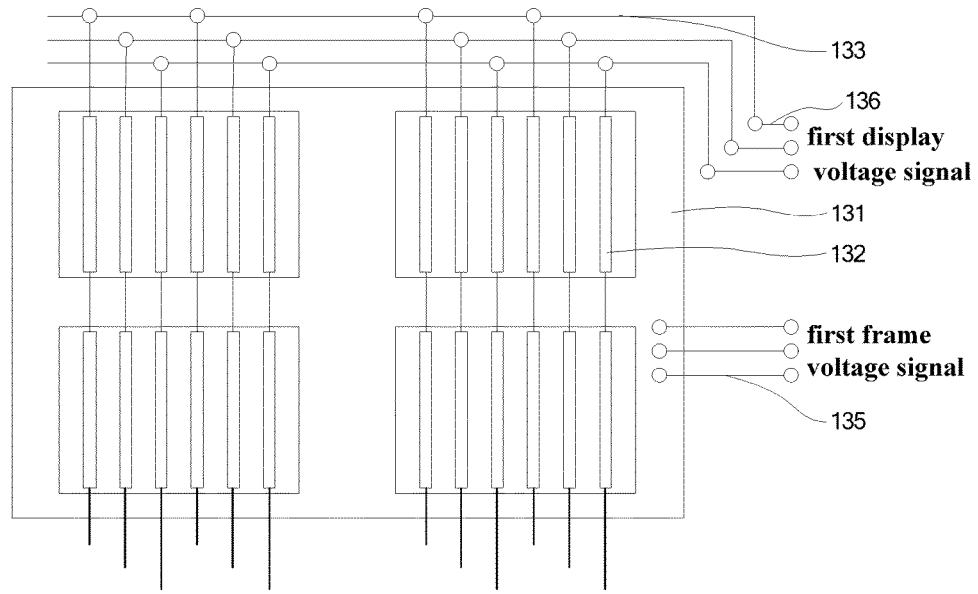
FIG. 3 is a schematic plan view of a first electrode layer of the liquid crystal grating according to an exemplary embodiment of the present disclosure.

It should be noted that a portion of the first display electrode 132 shown in FIG. 3, which is located in the display region 22, has a relatively larger line width, so as to ensure that the formed grating meets the requirements. On the other hand, a portion, which is located beyond the display region 22, has a relatively smaller line width, so as to reduce the overlap with the other electrical components as much as possible in the case of electrical connection, to reduce unnecessary parasitic capacitance. In view of simplification of the process, in an alternative embodiment of the present disclosure, the portion of the first display electrode 132, which is located in the display region 22, and the portion of the first display electrode 132, which is located beyond the display region 22, may have the same line width. A frame-shaped portion of the second frame electrode 141 surrounding the display region 22 may have a slightly larger line width than that of a portion for transmitting the voltage signal to the frame-shaped portion of the second frame electrode 141 surrounding the display region 22, so as to on the one hand ensure that the electrical field formed between the second frame electrode 141 and the first frame electrode 131 meets the requirements, and on the other hand reduce the overlap with the other electrical component. The frame-shaped portion of the second frame electrode 141 surrounding the display region 22 may also have the same line width as that of the portion for transmitting the voltage signal to the frame-shaped portion of the second frame electrode 141 surrounding the display region 22, so as to simplify the manufacturing process.

In the present embodiment, the first frame electrode 131 may be made of a metal material, for example, a metal material having a high reflectivity. In this way, the light rays emitted into the frame region 21 may be reflected towards the second substrate 12, to reduce the light loss of the light rays emitted into the frame region 21, thereby further improving the brightness of the frame region 21.

The second frame electrode 141, the first display electrode 132 and the second display electrode 142 may be made of a transparent conductive material, for example, indium tin oxide (ITO), so as to ensure a good light transmittance of the display region 22 of the first substrate 11 and the second substrate 12.

In the present embodiment, the first frame electrode 131 may be electrically insulated from the first display electrode 132, and the second frame electrode 141 may be electrically insulated from the second display electrode 142, so as to independently control the first frame electrode 131, the first display electrode 132, the second frame electrode 141 and the second display electrode 142, thereby enhancing flexible variability of the control for driving the liquid crystal grating.

In the present embodiment, the first frame electrode 131, the second frame electrode 141, the first display electrode 132 and the second display electrode 142 are not limited to a particular shape, for example, the first frame electrode 131 is a plate electrode, the second frame electrode 141 is a frame-shaped electrode, the first display electrode 132 is a grating type electrode and the second display electrode is a plate electrode. It should be noted that, in the present embodiment, the plate electrode refers to an electrode extending in the entire frame region 21 or display region 22 and having no patterns thereon.

In some embodiments, the first frame electrode 131 may be a plate electrode extending in a region corresponding to the frame region 21; the second frame electrode 141 may comprise at least one frame-shaped electrode configured to have an annular shape. If the second frame electrode 141 comprises a plurality of frame-shaped electrodes, the plurality of frame-shaped electrodes are sequentially arranged from outside to inside, and from large to small in a surrounding manner depending on the size thereof and electrically insulated from each other, so as to finely control the liquid crystal molecules in the frame region 21. The first display electrode 132 may be a grating type electrode composed of a plurality of elongated electrodes arranged in parallel with each other; and the second display electrode 142 may be a plate electrode extending in a region corresponding to the display region 22.

As shown in FIG. 3, according to a liquid crystal grating in accordance with an exemplary embodiment of the present disclosure, each grating units further comprises: a first frame signal line 135, a first display signal line 133, a second frame signal line 143 and a second display signal line 144. In an embodiment, the first frame signal line 135 is arranged at an outside of the first frame electrode 131, which is served as a common electrode for controlling the liquid crystal molecules in the frame region 21, to apply a first frame voltage signal, which is served as a common electrode voltage signal for the frame region, to the first frame electrode 131. For example, a first frame-chip lead may be provided on the edge of the first frame electrode 131 and served as the first frame signal line 135, so as to connect the first frame electrode 131 to a driving chip (not shown), to apply the first frame voltage signal as the common electrode voltage signal for the frame region. The first display signal line 133 is arranged at an outside of the first frame electrode 131 and electrically connected to the first display electrode 132. Further, a first display-chip lead 136 may be provided on an end of the first display signal line 133, so as to connect the first display electrode 132 to the driving chip (not shown), to apply a first display voltage signal to first display electrode 132 of the grating type.

In an exemplary embodiment, the first display electrode 132, the first frame signal line 135 and the first display-chip lead 136 may be formed from a transparent conductive material in the same one layer, and the first frame electrode 131 and the first display signal line 133 may be formed from a metal material in the same one layer. In particular, as shown in FIG. 6b, the first display electrode 132 may be electrically connected to the first display signal line 133 via a first via hole 6, the first frame signal line 135 may be electrically connected to the first frame electrode 131 via the first via hole 6, and the first display-chip lead 136 may be electrically connected to the first display signal line 133 via the first via hole 6.

It should be noted that the first display electrode 132 of the grating type comprises a plurality of parallel sub-grating electrodes arranged in a row direction. As for the liquid crystal grating comprising a plurality of grating units in a matrix arrangement, each first display electrode 132 in a column of grating units comprises a plurality of columns of sub-grating electrodes. In an embodiment, the plurality of sub-grating electrodes which belong to one column of grating units may be connected in series, so as to transmit the first display voltage signal through the same one first display signal line 133. In this case, the number of the required first display signal lines 133 should be identical to the number of the sub-grating electrodes of the first display electrode 132 in one grating unit.

Figure 4:
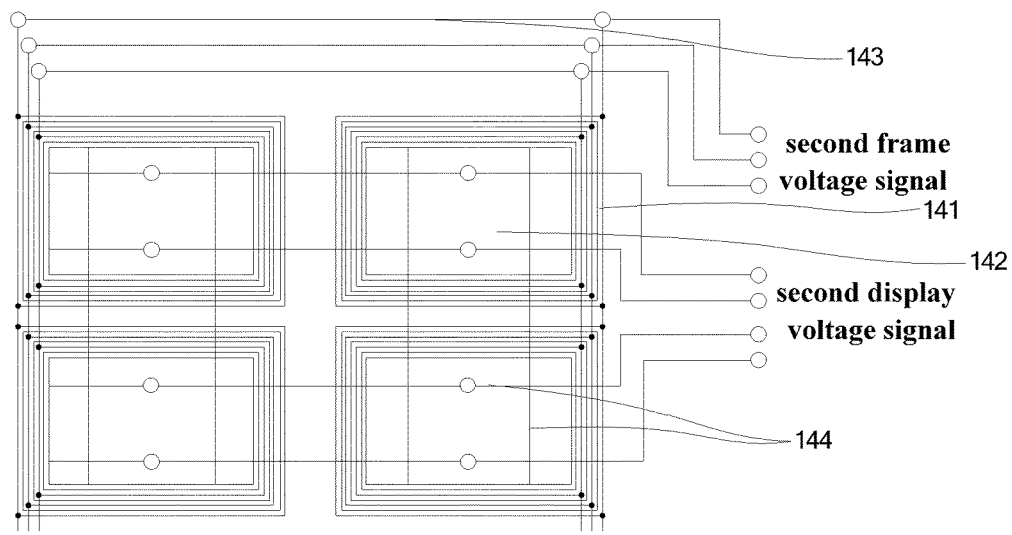
FIG. 4 is a schematic plan view of a second electrode layer of the liquid crystal grating according to an exemplary embodiment of the present disclosure.
Figure 5:
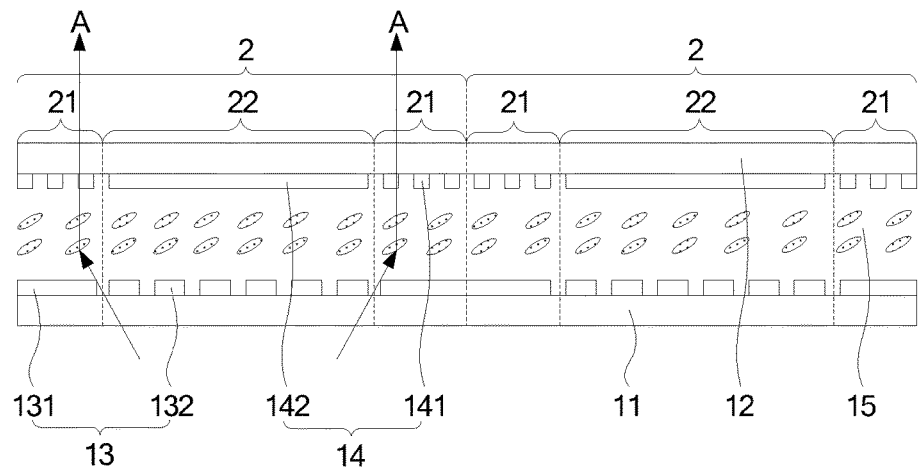
FIG. 5 is a detailed partial schematic cross-sectional view of the liquid crystal grating according to an exemplary embodiment of the present disclosure.

As shown in FIG. 4, in order to apply the voltages to the second frame electrode 141 and the second display electrode 142, respectively, in each grating unit, a second frame signal line 143 is arranged at an outside of the second frame electrode 141, the second frame signal line 143 is electrically connected to the second frame electrode 141 to apply a second frame voltage signal to the second frame electrode 141; a second display signal line 144 extends beyond a periphery of the second frame electrode 141 through the display region 22, the second display signal line 144 is electrically connected to the second display electrode 142 to apply a second display voltage signal, which is served as the common electrode voltage signal for the display region, to the second display electrode 142.

In the present embodiment, the second frame signal line 143 and the second display signal line 144 may be formed from a metal material in the same one layer, and the second frame electrode 141 and the second display electrode 142 may be formed from a transparent conductive material in the same one layer. As shown in FIG. 7b, the second frame signal line 143 is electrically connected to the second frame electrode 141 via a second via hole 7, and the second display signal line 144 is electrically connected to the second display electrode 142 via the second via hole 7. In addition, the second frame signal line 143 and the second display signal line 144 may be led to the driving chip (not shown) by filling a transparent conductive material in the second via hole 7, respectively, while forming the second frame electrode 141 and the second display electrode 142.

It should be noted that, as for the liquid crystal grating comprising a plurality of grating units in a matrix arrangement, when the frame-shaped second frame electrode 141 comprises a plurality of frame-shaped electrodes sequentially arranged from outside to inside in a surrounding manner depending on the size thereof, the frame-shaped electrodes having an identical size in the second display electrodes 141 of one column of grating units may be connected in series, so as to transmit the second frame voltage signal through the same one second frame signal line 143. In this case, the number of the required second frame signal line 143 should be identical to the number of the frame-shaped electrodes of the second display electrodes 141 in one grating unit.

In addition, in order to improve the uniformity of the voltage applied to the second display electrode 142, the second display signal lines 144 may be longitudinally and transversely arranged above the second display electrode 142 to transmit the second display voltage signal to the second display electrode 142.

A voltage difference between the first frame voltage signal and the second frame voltage signal is formed, so as to control the deflection of the liquid crystal molecules in the frame region 21, and a voltage difference between the first display voltage signal and the second display voltage signal is formed, so as to control the deflection of the liquid crystal molecules in the display region 22.

The first display signal line 133, the second display signal line 144 and the second frame signal line 143 are made of the metal material in the above-described embodiments, however, the present disclosure is not limited thereto. In other embodiments of the present disclosure, they may be also made of any other suitable conductive materials.

As described above, it may be appreciated by the person skilled in the art that the first electrode assembly 13 arranged on the first substrate 11 comprises, not exclusively, the first frame electrode 131, the first display electrode 132, the first frame signal line 135 and the first display signal line 133; the second electrode assembly 14 arranged on the second substrate 12 comprises, not exclusively, the second frame electrode 141, the second display electrode 142, the second frame signal line 143 and the second display signal line 144.

If the second display signal line 144 is made of an opaque material, such as metal, it would produce a certain shielding effect to the light rays. In order to avoid the shielding effect from adversely affecting the display effect due to the second display signal line 144 passing through the display region 22, the second display signal line 144 may be arranged as follows: a vertical projection of the second display signal line 144 on the first substrate 11 is partially overlapped with a vertical projection of a black matrix of a display module on the first substrate 11 when the liquid crystal grating and the display module are stacked together.

In the present embodiment, a flexible substrate may be adopted as the first substrate 11 and the second substrate 12 of the liquid crystal grating, so as to allow the liquid crystal grating to be flexible, to meet the requirements of the flexible display module or spliced screen.

According to a further aspect of the present disclosure, there is provided a method for manufacturing the liquid crystal grating according to the above embodiments. The manufacturing method comprises steps of: forming at least one display region 22 and at least one frame region 21 surrounding the display region 22 on a first substrate 11 and a second substrate 12, respectively; forming at least one first frame electrode 131 arranged corresponding to the frame region 21 on the first substrate 11; forming at least one second frame electrode 141 arranged corresponding to the frame region 21 on the second substrate 12; assembling the first substrate 11 with the second substrate 12 together; and filling liquid crystal molecules between the first substrate 11 and the second substrate 12 to form at least one grating unit by the display region 22 and the frame region 21 on the first substrate 11 and the second substrate 12, and the liquid crystal molecules therebetween.

The first frame electrode 131 and the second frame electrode 141 are configured for forming a voltage difference when displaying in the display region 22 in a 3D or 2D mode, so as to control deflection of the liquid crystal molecules in the frame region 21, such that light rays scattered into the frame region 21 are emitted out from the frame region of the second substrate 12, resulting in a frame region 21 of the liquid crystal grating having a certain display brightness. Therefore, when the manufactured liquid crystal grating is stacked with the spliced screen, the frame region 21 of the liquid crystal grating covers the seam of the spliced screen. As a result, the seam seems to be invisible, thereby improving the display quality of the spliced screen.

In order to enable the display module comprising the liquid crystal grating to have both a 3D display function and a 2D display function, the step of forming at least one first frame electrode 131 on the first substrate 11 comprises a step of forming a first display electrode 132 on the first substrate 11, wherein the first display electrode 132 is arranged corresponding to the display region 22; the step of forming at least one second frame electrode 141 on the second substrate 12 comprises a step of forming a second display electrode 142 on the second substrate 12, wherein the second display electrode 142 is arranged corresponding to the display region 22. When a 3D display is needed, a voltage difference is formed between the first display electrode 132 and the second display electrode 142, so as to control deflection of the liquid crystal molecules in the display region 22, to form a grating in the display region 22. When a 2D display is needed, voltages applied to the first display electrode 132 and the second display electrode 142 are kept identical to each other, so as to control the liquid crystal molecules in the display region 22 to be in an initial alignment state, to allow all light rays to transmit through the display region 22.

Next, taking the first electrode layer 13 shown in FIG. 3 and the second electrode layer 14 shown in FIG. 4 as an example, manufacturing processes for the first electrode layer 13 and the second electrode layer 14 are described in detail.

Figure 6A:
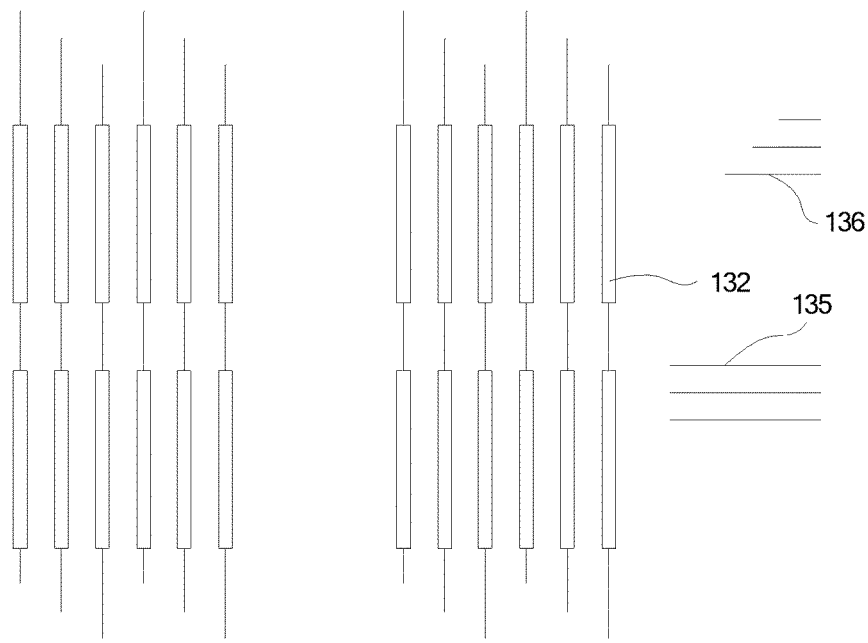
FIGS. 6a-6c are schematic views showing steps for manufacturing the first electrode layer of the liquid crystal grating according to an exemplary embodiment of the present disclosure.
Figure 6B:
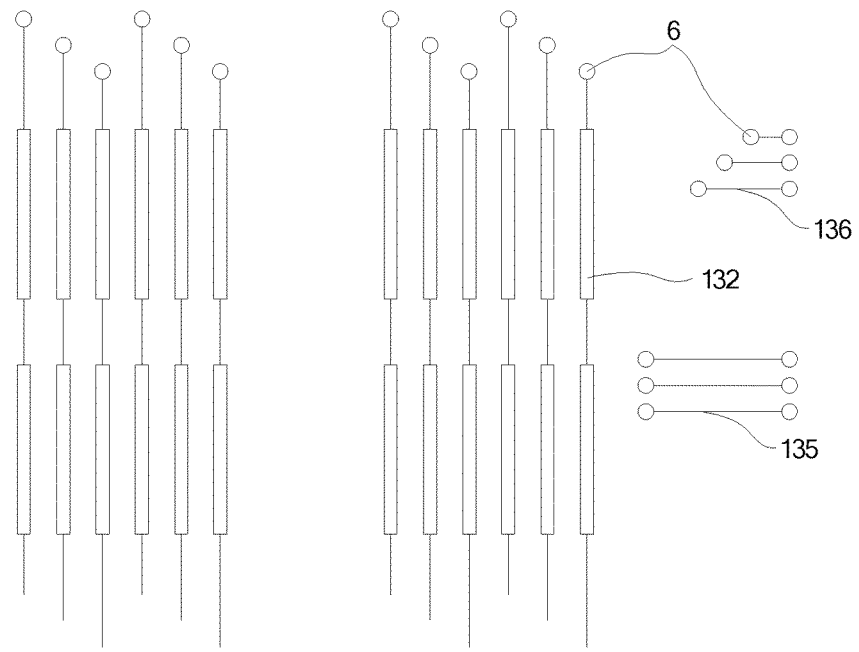
Figure 6C:
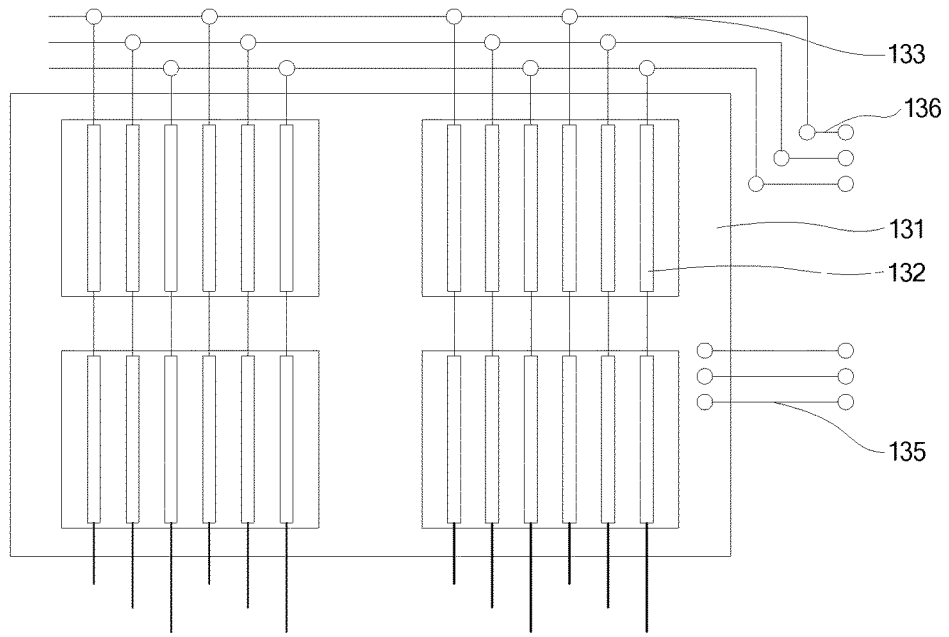

As shown in FIGS. 6a-6c, the step of forming at least one first frame electrode 132 on the first substrate 11 comprises steps of:

Step S11: forming a pattern comprising the first display electrode 132 on the first substrate 11, the first display electrode 132 being a grating type electrode, as shown in FIG. 6a. In the step S11, a first frame signal line 135 for connecting an external driving chip (not shown) with the first frame electrode, which would be formed in the subsequent steps, and a first display-chip lead 136 for connecting the external driving chip with a first display signal line, which would be formed in the subsequent steps, may be formed in the same layer as the first display electrode 132. The first display electrode 132, the first frame signal line 135 and first display-chip lead 136 may be made from a transparent conductive material through a patterning process.

Step S12: forming an insulation layer (not shown) on the first substrate 11 formed with the first display electrode 132. The insulation layer is configured for keeping the first display electrode 132 and the subsequently formed first frame electrode to be electrically insulated with each other.

Step S13: forming a first via hole 6 in the insulation layer to expose the first display electrode 132, as shown in FIG. 6b. In particular, the exposed regions via the first via hole 6 comprise an end of the first display electrode 132 for electrically connecting with a subsequently formed first display signal line 133, an end of the first frame signal line 135, and two ends of the first display-chip lead 136.

Step S14: forming a pattern comprising the first frame electrode 131 and a first display signal line 133 on the insulation layer, wherein the first frame electrode 131 is formed as a plate electrode, the first display signal line 133 is located around the first frame electrode 131 and the first display signal line 133 is electrically connected to the first display electrode 132 through the first via hole 6, as shown in FIG. 6c. In the step S14, the first frame electrode 131 and the first display signal line 133 may be made from a metal material through a patterning process, so as to ensure a good conductivity.

While the first display signal line 133 is electrically connected to the first display electrode 132, the first display signal line 133 is electrically connected to the first display-chip lead 136, the first frame electrode 131 and the first frame signal line 135.

Figure 7A:
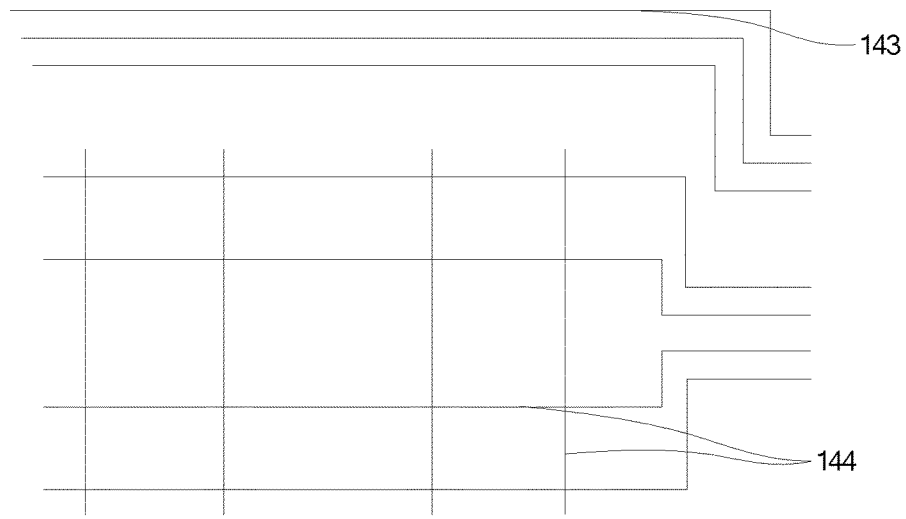
FIGS. 7a-7c are schematic views showing steps for manufacturing the second electrode layer of the liquid crystal grating according to an exemplary embodiment of the present disclosure.
Figure 7B:
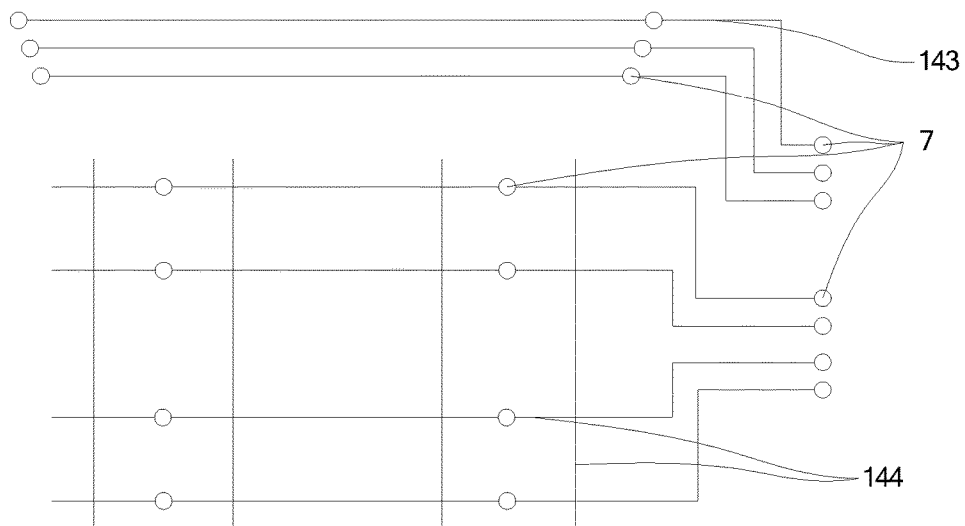
Figure 7C:
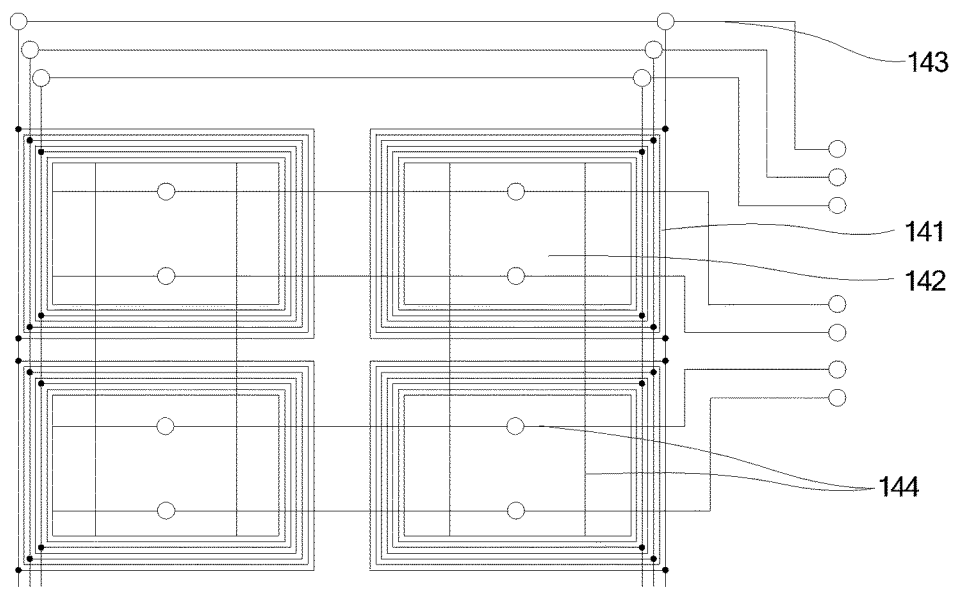

As shown in FIGS. 7a-7c, the step of forming at least one second frame electrode 141 on the second substrate 12 comprises steps of:

Step S21: forming a pattern comprising a second frame signal line 143 and a second display signal line 144 on the second substrate 12, wherein the second frame signal line 143 is located around the second frame electrode to be formed. A vertical projection of the second display signal line 144 on the first substrate 11 is partially overlapped with a vertical projection of a black matrix of a display module on the first substrate 11 when the liquid crystal grating and the display module are stacked together, as shown in FIG. 7a. In the step S21, the second frame signal line 143 and the second display signal line 144 may be made from a metal material through a patterning process.

Step S22: forming an insulation layer (not shown) on the second substrate 12 formed with the second frame signal line 143 and the second display signal line 144;

Step S23: forming a second via hole 7 in the insulation layer to expose the second frame signal line 143 and the second display signal line 144, as shown in FIG. 7b. In the step S23, a vertical projection of the second via hole 7 for exposing the second display signal line 144 on the first substrate 11 is fallen into a vertical projection of the black matrix of the display module on the first substrate 11, so as to not adversely affect the display image.

Ends of the second frame signal line 143 and the second display signal line 144 close to the outer side of the liquid crystal grating may be exposed through the second via hole 7, so that the external driving chip (not shown) may be connected to the second frame signal line 143 and the second display signal line 144 via the second via hole 7, respectively, in the subsequent steps.

Step S24: forming the second frame electrode 141 and the second display electrode 142 on the insulation layer. The second frame signal line 143 is located around the second frame electrode 141; the second frame electrode 141 is a frame-shaped electrode, and the second frame electrode 141 is electrically connected to the second frame signal line 143 through the second via hole 7; the second display electrode 142 is a plate electrode, and the second display electrode 142 is electrically connected to the second display signal line 144 through the second via hole 7, as shown in FIG. 7c.

In the step S24, the second frame electrode 141 and the second display electrode 142 may be simultaneously made from a transparent conductive material through a patterning process. At the same time, the second via hole 7 located at the ends of the second frame signal line 143 and the second display signal line 144 close to the outer side of the liquid crystal grating is also filled with the transparent conductive material, so that the driving chip (not shown) may be electrically connected to the second frame signal line 143 and the second display signal line 144 through the second via hole 7, to further transmit the corresponding signals to the second frame electrode 141 and the second display electrode 142.

It should be noted that the methods of manufacturing the first electrode layer 13 and the second electrode layer 15 are described with reference to the steps S11 to S14 and the steps S21 to S24, respectively, however, the present disclosure is not limited thereto. In the practical design and production processes, the steps S11 to S14 and the steps S21 to S24 may be modified by the person skilled in the art based on the detailed structures, materials, driving modes and the like of the first frame electrode 131, the first display electrode 132, the second frame electrode 141 and the second display electrode 142 to be prepared, to obtain the desired first frame electrode 131, first display electrode 132, second frame electrode 141 and second display electrode 142.

According to a still further aspect of the present disclosure, there is provided a method for driving a liquid crystal grating according to the above embodiments. The driving method comprises a step of: applying different voltage signals to the first frame electrode 131 and the second frame electrode 141 when driving the display region to display in a 3D or 2D mode, so as to form a voltage difference between the first frame electrode 131 and the second frame electrode 141, to control deflection of the liquid crystal molecules in the frame region 21, so that light rays A scattered into the frame region 21 are emitted out from the frame region 21 of the second substrate 12.

According to the driving method in accordance with the embodiment of the present disclosure, different voltage signals are applied to the first frame electrode 131 and the second frame electrode 141, so that a voltage difference between the first frame electrode 131 and the second frame electrode 141 is formed, thereby, it is possible to control the deflection of the liquid crystal molecules in the frame region 21. Thus, the light rays scattered into the frame region 21 may be emitted out from the frame region of the second substrate 12, resulting in the frame region 21 having a certain display brightness. Therefore, when the manufactured liquid crystal grating is stacked with the spliced screen, the frame region 21 of the liquid crystal grating is overlapped over the seam of the spliced screen. as a result, the seam seems to be invisible, thereby improving the display quality of the spliced screen.

In an embodiment, each grating units of the liquid crystal grating further comprises a first display electrode 132 and a second display electrode 142 arranged corresponding to the display region 22. The driving method further comprises: applying different voltage signals to the first display electrode 132 and the second display electrode 142, so that a voltage difference is formed between the first display electrode 132 and the second display electrode 142, to control deflection of the liquid crystal molecules in the display region 22. In this way, a grating is formed in the display region 22, achieving a 3D display in the display region. After the grating is formed, since there is a parallax between the left eye and the right eye, during displaying one frame, the left eye can only see the pixels displaying the image for the left eye and the right eye can only see the pixels displaying the image for the right eye through one light shielding region of the grating. Since the image for the left eye and the image for the right eye are captured by different angles, the image for the left eye and the image for the right eye are overlapped to form a 3D display effect.

On the other hand, the driving method further comprises: applying an identical voltage signal or no voltage signal to the first display electrode 132 and the second display electrode 142, so as to keep the first display electrode 132 and the second display electrode 142 under an identical voltage. In this case, the liquid crystal molecules in the display region 22 is controlled in an initial alignment state, to allow all light rays to transmit through the display region 22, achieving a 2D display in the display region. When displaying in a 2D mode, it is unnecessary to form a grating in the display region 22 as long as all the light rays are allowed to transmit through the display region 22 of the liquid crystal grating.

In an embodiment, if the first frame electrode 131 is formed as a plate electrode, the second frame electrode 141 is formed as a frame-shaped electrode, the first display electrode 132 is formed as a grating type electrode and the second display electrode 142 is formed as a plate electrode, then the step of applying the different voltage signals to the first frame electrode 131 and the second frame electrode 141 comprises steps of: applying a first frame voltage signal to the first frame electrode 131, and applying a second frame voltage signal to the second frame electrode 141; and the step of applying the different voltage signals to the first display electrode 132 and the second display electrode 142 comprises steps of: applying a first display voltage signal to the first display electrode 132, and applying a second display voltage signal to the second display electrode 142, so as to form voltage differences in the frame region 21 and the display region 22, respectively, to control the liquid crystal molecules in the respective regions to differently deflect.

According to a yet further aspect of the present disclosure, there is provided a spliced screen, comprising: at least one display module spliced with each other in a matrix arrangement; and the liquid crystal grating according to the above various embodiments, wherein the liquid crystal grating is configured to cover display surfaces of the plurality of display modules, the liquid crystal grating comprises at least one grating unit 2 overlapped with the at least one display module, respectively.

According to the spliced screen in accordance with the embodiments of the present disclosure, when displaying, the frame region 21 of the liquid crystal grating according to the present disclosure has a certain display brightness. When such a liquid crystal grating is overlapped over the spliced display modules, the frame region 21 of the liquid crystal grating would rightly cover the spliced seam of the spliced display modules. As a result, when the display image of the spliced screen is viewed by an user, the brightness of the frame region 21 of the liquid crystal grating at the seam causes that the seam seems to be invisible, thereby greatly improving the display quality of the spliced image.

In the present embodiment, the frame regions 21 of the grating units 2 of the liquid crystal grating are overlapped with the frame regions of the display modules, respectively, and the display regions of the grating units 2 are overlapped with the display regions of the display modules, respectively, thereby ensuring that the frame regions 21 of the liquid crystal grating may completely cover the spliced seam of the frame regions of the display modules.

A substrate of the at least one display module close to the liquid crystal grating may be served as the first substrate 11 of the liquid crystal grating, that is, the plurality of display modules may share the substrate with the liquid crystal grating at the interface therebetween. Thus, the pattern of the first electrode layer 13 of the liquid crystal grating may be directly formed on a side of the plurality of display modules close to the substrate of the liquid crystal grating and facing to the liquid crystal grating, so as to achieve the purpose of reducing cost.

The spliced screen according to the present embodiment is preferably a flexible spliced screen, in other words, the substrates for the display module and the liquid crystal grating are both made from a flexible substrate.

It should be noted that the display module according to the present embodiments may be a liquid crystal panel, an electronic paper or an OLED (organic light-emitting diode) panel.

It should be understood that the above embodiments are merely exemplary embodiments intended to explain the principle of the present disclosure, however, the present disclosure is not limited thereto. Various modifications and alternatives may be made to the embodiments of the present disclosure without deviating from the spirit and scope of the present disclosure, and all the modifications and alternatives fall within the scope of the present disclosure.

What is claimed is:

1. A liquid crystal grating, comprising:
a first substrate and a second substrate arranged opposite to the first substrate; and
liquid crystal molecules filled between the first substrate and the second substrate, wherein the first substrate, the second substrate and the liquid crystal molecules are provided to define at least one grating unit, and each grating unit comprises:
a display region;
a frame region surrounding the display region;
a first frame electrode located on the first substrate arranged corresponding to the frame region, and comprising a plate electrode extending in a region corresponding to the frame region; and
a second frame electrode located on the second substrate arranged corresponding to the frame region, and comprising a plurality of frame-shaped electrodes, sequentially arranged from large to small, from outside to inside of the frame region, in a surrounding manner, and electrically insulated from each other,
wherein the first frame electrode and the second frame electrode are configured for forming a voltage difference, when displaying in the display region to control deflection of the liquid crystal molecules in the frame region, such that light rays scattered into the frame region are emitted out from the frame region of the second substrate.

2. The liquid crystal grating according to claim 1, wherein each grating unit further comprises:
a first display electrode located on the first substrate and arranged corresponding to the display region; and
a second display electrode located on the second substrate and arranged corresponding to the display region, wherein the first display electrode and the second display electrode are configured for forming a voltage difference to control deflection of the liquid crystal molecules in the display region, such that a grating is formed in the display region to achieve a 3D display in the display region; or the first display electrode and the second display electrode are configured to be kept under an identical voltage to control the liquid crystal molecules in the display region to be in an initial alignment state, such that all light rays are allowed to transmit through the display region to achieve a 2D display in the display region.

3. The liquid crystal grating according to claim 2, wherein the first frame electrode is made of a metal material, and the second frame electrode, the first display electrode and the second display electrode are made of a transparent conductive material.

4. The liquid crystal grating according to claim 2, wherein the first frame electrode is electrically insulated from the first display electrode, and the second frame electrode is electrically insulated from the second display electrode.

5. The liquid crystal grating according to claim 2, wherein the first display electrode comprises a grating type electrode and the second display electrode comprises a plate electrode.

6. The liquid crystal grating according to claim 2, wherein each grating unit further comprises:
    a first frame signal line arranged at an outside of the first frame electrode to apply a first frame voltage signal to the first frame electrode;
    a first display signal line arranged at an outside of the first frame electrode, the first display signal line being electrically connected to the first display electrode through a first via hole to apply a first display voltage signal to the first display electrode;
    a second frame signal line arranged at an outside of the second frame electrode, the second frame signal line being electrically connected to the second frame electrode through a second via hole to apply a second frame voltage signal to the second frame electrode; and
    a second display signal line extending beyond a periphery of the second frame electrode from the display region, the second display signal line being electrically connected to the second display electrode through the second via hole to apply a second display voltage signal to the second display electrode,
    wherein a voltage difference between the first frame voltage signal and the second frame voltage signal is formed, and a voltage difference between the first display voltage signal and the second display voltage signal is formed.

7. The liquid crystal grating according to claim 6, wherein the first display signal line, the second display signal line and the second frame signal line are made of a metal material.

8. The liquid crystal grating according to claim 6, wherein a vertical projection of the second display signal line on the first substrate is partially overlapped with a vertical projection of a black matrix of a display module on the first substrate when the liquid crystal grating and the display module are stacked together.

9. The liquid crystal grating according to claim 1, wherein the first substrate and the second substrate each is a flexible substrate.

10. A method for manufacturing a liquid crystal grating, comprising steps of:

forming at least one display region and at least one frame region surrounding the display region on a first substrate and a second substrate, respectively;

forming at least one first frame electrode, arranged corresponding to the frame region, on the first substrate, the first frame electrode comprising a plate electrode extending in a region corresponding to the frame region;

forming at least one second frame electrode, arranged corresponding to the frame region, on the second substrate, the second frame electrode comprising a plurality of frame-shaped electrodes, sequentially arranged from large to small, from outside to inside of the frame region, in a surrounding manner, and electrically insulated from each other;

assembling the first substrate and the second substrate together; and filling liquid crystal molecules between the first substrate and the second substrate such that at least one grating unit is formed by the display region and the frame region on the first substrate and the second substrate, and the liquid crystal molecules, wherein the first frame electrode and the second frame electrode are configured for forming a voltage difference when displaying in the display region to control deflection of the liquid crystal molecules in the frame region, such that light rays scattered into the frame region are emitted out from the frame region of the second substrate.

11. The manufacturing method according to claim 10, wherein, the step of forming at least one first frame electrode on the first substrate comprises a step of forming a first display electrode, arranged corresponding to the display region, on the first substrate;

the step of forming at least one second frame electrode on the second substrate comprises a step of forming a second display electrode, arranged corresponding to the display region, on the second substrate;

wherein the first display electrode and the second display electrode are configured for forming a voltage difference to control deflection of the liquid crystal molecules in the display region, such that a grating is formed in the display region to achieve a 3D display in the display region; or the first display electrode and the second display electrode are configured to be kept under an identical voltage to control the liquid crystal molecules in the display region to be in an initial alignment state, such that all light rays are allowed to transmit through the display region to achieve a 2D display in the display region.

12. The manufacturing method according to claim 11, wherein the step of forming at least one first frame electrode on the first substrate comprises steps of:

forming a pattern comprising the first display electrode on the first substrate, the first display electrode comprising a grating type electrode;

forming an insulation layer on the first substrate formed with the first display electrode;

forming a first via hole in the insulation layer to expose the first display electrode; and forming a pattern comprising the first frame electrode and a first display signal line on the insulation layer, wherein the first display signal line is located at an outside of the first frame electrode, and the first display signal line is electrically connected to the first display electrode through the first via hole.

13. The manufacturing method according to claim 11, wherein the step of forming at least one second frame electrode, arranged corresponding to the display region, on the second substrate comprises steps of:
- forming a pattern comprising a second frame signal line and a second display signal line on the second substrate;
- forming an insulation layer on the second substrate formed with the second frame signal line and the second display signal line;
- forming a second via hole in the insulation layer to expose the second frame signal line and the second display signal line; and
- forming the second frame electrode and the second display electrode on the insulation layer,
- wherein the second frame signal line is located at an outside of the second frame electrode, the second frame electrode is electrically connected to the second frame signal line through the second via hole, the second display electrode comprises a plate electrode, and the second display electrode is electrically connected to the second display signal line via the second via hole.

14. The manufacturing method according to claim 13, wherein a vertical projection of the second display signal line on the first substrate is partially overlapped with a vertical projection of a black matrix of a display module on the first substrate when the liquid crystal grating and the display module are stacked together.

15. A spliced screen, comprising:
- at least one display module spliced with each other in a matrix arrangement; and
- the liquid crystal grating according to claim 1,
- wherein the liquid crystal grating is configured to cover a display surface of the at least one display module, and at least one grating unit of the liquid crystal grating is overlapped with the at least one display module, respectively.

16. The spliced screen according to claim 15, wherein the frame regions of the grating units are overlapped with frame regions of the display modules, respectively, and the display regions of the grating units are overlapped with display regions of the display modules, respectively.

17. The spliced screen according to claim 15, wherein a substrate of the at least one display module close to the liquid crystal grating is served as the first substrate of the liquid crystal grating.

18. The spliced screen according to claim 15, wherein the spliced screen is a flexible spliced screen.

19. The liquid crystal grating according to claim 5, wherein,
- the first display electrode comprises a plurality of elongated sub-grating electrodes arranged in parallel with each other; and
- the second display electrode comprises a plate electrode extending in a region corresponding to the display region.

* * * * *